(12) United States Patent
Rey

(10) Patent No.: US 11,962,216 B2
(45) Date of Patent: Apr. 16, 2024

(54) ANNULAR ELECTROMAGNETIC INDUCTION PUMP

(71) Applicant: COMMISSARIAT A L'ENERGIE ATOMIQUE ET AUX ENERGIES ALTERNATIVES, Paris (FR)

(72) Inventor: Frédéric Rey, Pierrevert (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 178 days.

(21) Appl. No.: 17/641,076

(22) PCT Filed: Aug. 13, 2020

(86) PCT No.: PCT/EP2020/072706
§ 371 (c)(1),
(2) Date: Mar. 7, 2022

(87) PCT Pub. No.: WO2021/047854
PCT Pub. Date: Mar. 18, 2021

(65) Prior Publication Data
US 2022/0345022 A1    Oct. 27, 2022

(30) Foreign Application Priority Data

Sep. 12, 2019 (FR) ...................................... 1910030

(51) Int. Cl.
*H02K 44/06* (2006.01)
*G21C 15/247* (2006.01)
*H02K 44/02* (2006.01)

(52) U.S. Cl.
CPC ........... *H02K 44/06* (2013.01); *G21C 15/247* (2013.01); *H02K 44/02* (2013.01)

(58) Field of Classification Search
CPC ....... H02K 44/02; H02K 44/06; G21C 15/247
(Continued)

(56) References Cited

U.S. PATENT DOCUMENTS 4,557,667 A * 12/1985 Delassus ................ H02K 44/06
310/11
5,094,803 A * 3/1992 Nishiguchi ............. F22B 1/063
376/405
(Continued)

FOREIGN PATENT DOCUMENTS

FR    2 647 585 A1    11/1990
FR    3 073 972 A1    5/2019
(Continued)

*Primary Examiner* — Christopher S Bobish
(74) *Attorney, Agent, or Firm* — BakerHostetler

(57) ABSTRACT

An electromagnetic induction pump includes a tubular internal inductor having internal combs and internal coils between teeth of the internal combs. The inside of the internal inductor forms a cavity. An internal tube is positioned around the internal inductor. A pumping canal allows circulation of a fluid. The canal is between the internal tube and external tube. A tubular external inductor is positioned around the external tube and includes external combs and external coils positioned between teeth of the external combs. An electromagnetic pump includes a movement device for moving the internal combs, and varies the radial clearance between the internal combs and internal tube, having a first part positioned inside the internal inductor and in connection with the internal combs to move them radially, and a second part extending at least partially outside of the internal inductor and connected to the first part to control the first part.

16 Claims, 7 Drawing Sheets

(58) Field of Classification Search
USPC .......................................................... 417/50
See application file for complete search history.

(56) References Cited

U.S. PATENT DOCUMENTS

| | | | | |
|---|---|---|---|---|
| 5,240,382 A * | 8/1993 | Bessho | ................. | H02K 44/06 310/11 |
| 5,382,860 A * | 1/1995 | Fanning | ................. | H02K 1/12 310/216.061 |
| 5,642,011 A * | 6/1997 | Fanning | ................. | H02K 1/12 310/216.061 |

FOREIGN PATENT DOCUMENTS

| | | | |
|---|---|---|---|
| JP | 5-38126 | A | 2/1993 |
| JP | 10-304647 | A | 11/1998 |
| JP | 11-104817 | A | 4/1999 |

* cited by examiner

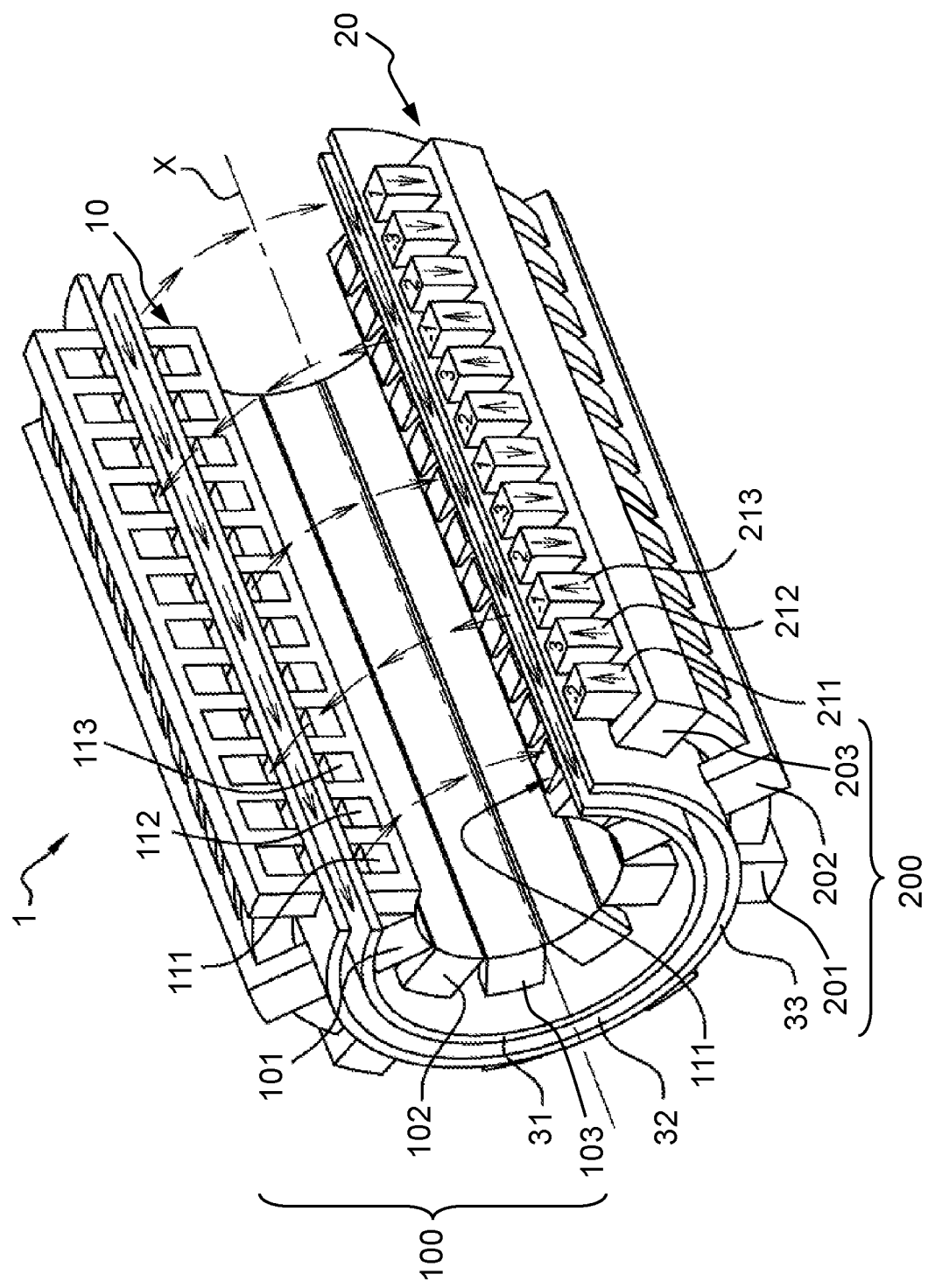
PRIOR ART  FIG.1

ANNULAR ELECTROMAGNETIC INDUCTION PUMP

CROSS-REFERENCE TO RELATED APPLICATIONS

This application is a National Stage of International patent application PCT/EP2020/072706, filed on Aug. 13, 2020, which claims priority to foreign French patent application No. FR 1910030, filed on Sep. 12, 2019, the disclosures of which are incorporated by reference in their entirety.

FIELD OF THE INVENTION

The present invention relates to electromagnetic pumps (which may be referred to hereinafter as "EM pumps") and more specifically to annular EM induction pumps, particularly those of high power, typically above 500 kW.

The invention may notably find an application in sodium-cooled fast neutron reactors, commonly referred to as "Na-FRs", especially in the secondary cooling circuits of Na-FRs.

BACKGROUND

Conventionally, it is known practice to use electromagnetic pumps to pump liquid metal. In this particular field of use with liquid metals, such pumps actually offer numerous advantages over mechanical pumps. An electromagnetic pump does not require a lubrication circuit because it has no moving parts, and therefore no parts that require lubricating. This offers greater reliability in comparison with mechanical pumps. Moreover, the cooling circuit for an electromagnetic pump advantageously uses the liquid metal, for example the sodium, that it is pumping. In that case, the electromagnetic pump is generally defined as being passively cooled. Thus, an electromagnetic pump makes it possible to limit the number of auxiliary circuits, while at the same time allowing an increase in overall reliability.

Electromagnetic pumps use the Laplace force to which a conductor, in this instance the liquid metal that is moving through a pumping canal, which may be referred to simply as "canal" is subjected when it is placed in a magnetic field and has an electric current passing through it. In the case of pumps carrying fluids through heat-transfer circuits, such as, for example, the primary or secondary cooling circuits of a nuclear reactor, induction pumps are the only conceivable technology because of the pumping powers required. In what follows, said electromagnetic induction pumps will be referred to as "electromagnetic pumps" for the sake of simplification. The principle of operation of this type of pump is to generate the current inside the pumping canal by means of a time-variable electromagnetic field created by a (sliding or rotary) inductor.

A known annular linear induction pump (often know by its acronym "ALIP") is described in patent FR3073972 and reproduced in FIG. 1.

The annular electromagnetic induction pump 1 illustrated in FIG. 1 comprises, starting from a central axis X of said electromagnetic pump:
- an internal inductor (which may also be referred to as "internal stator") 10;
- an internal tube 31 containing the internal inductor;
- a pumping canal 32 in which the fluid that is to be pumped circulates, the internal wall of the pumping canal being formed by the internal tube 31,
- an external tube 33 forming the external wall of the pumping canal and around which the external inductor is positioned, the pumping canal being between the internal tube and the external tube;
- an external inductor (which may also be referred to as "external stator") 20 positioned around the external tube 33.

The internal inductor, the internal tube, the pumping canal, the external tube and the external inductor are concentric about the central axis X.

Each of the internal and external inductors 10 and 20 is made up of:
- a collection of magnetic lamination stacks 100 and 200, generally referred to as combs, and respectively individually designated 101, 102, 103 and 201, 202, 203,
- coils 111, 112, 113 and 211, 212, 213 which succeed one another along the central axis X of the electromagnetic pump 1, each coil having an annular shape wound around said central axis.

The combs 101, 102, 103 of the internal inductor 10 may be referred to as "internal combs". The combs 201, 202, 203 of the external inductor 20 may be referred to as "external combs".

Each comb features peripheral grooves or slots each forming a housing through which the coils pass.

In order to generate a magnetic field that is sliding along the main axis, the coils 111, 112, 113 and 211, 212, 213 of the internal and external magnetic inductors 10, 20 are powered from a polyphase, generally three-phase, electrical network.

The electromagnetic pump illustrated is passively cooled. It is advantageously used for the secondary cooling circuits of Na-FNRs. In such cases, and at high temperature levels (typically in excess of 200° C.), it is necessary to have complete control over the heat transfers internal to the pump. This is because the windings of the internal and external inductors are sources of thermal power the heat from which needs to be removed. This is particularly true of the internal inductor for which the only possible interface for heat transfer is the internal tube in contact with the sodium which removes the heat thus transferred.

In that case, it is absolutely essential to have close control over the removal of heat from the internal inductor of an electromagnetic pump. In general, it is essential to have close control over the heat transfers of an electromagnetic pump.

Patent application JPH10304647 discloses a contact-maintaining system, formed by an elastic body, for maintaining contact between the comb of the (external and/or internal) inductor and the (internal and/or external) tube of an annular electromagnetic induction pump. The elastic body is of the spring type and is designed to absorb the differences in radial thermal expansion between the various elements. One disadvantage of this solution is that the intensity of the contact force cannot be regulated, especially once the electromagnetic pump is assembled. Furthermore, once the electromagnetic pump is assembled, and notably once the internal inductor has been inserted, there is no longer the possibility to apply a contact force if the elastic body has not been provided. In addition, the solution offered may impede the insertion of the internal inductor into the electromagnetic pump. Finally, the contact force cannot be regulated without resorting to dismantling the pump.

Patent JPH11104817 also describes a contact-maintaining system formed by a series of exterior springs, for maintaining contact between the comb of the (external and/or internal) inductor and the (internal and/or external) tube of an annular electromagnetic induction pump. The exterior inductor contact system is adjustable by means of a screw-nut system arranged laterally and which applies more or less compression to the exterior springs and thus regulates the forces applied to the external tube. The internal inductor can be removed, via the upper part. Nevertheless, the forces provided by the interior springs are not adjustable unless the internal inductor is removed and the contact system is changed.

In all these solutions offered, the system for assembling the electromagnetic pump is difficult and the contact-inducing system is lengthy and difficult to regulate, or even, in the case of the internal inductor, impossible to regulate.

There is therefore a real need for a system for ensuring contact between an inductor and the pumping canal of an electromagnetic pump, notably in the case of an internal inductor of an electromagnetic pump, that is easy to implement and rapid to regulate while at the same time affording the same quality of contact in order to obtain the same heat-removal performance as with the patents of the prior art, or even providing better performance.

Advantageously, the invention needs to be able to address this problem without the need to dismantle said pump, while at the same time maintaining the ease of assembly of the internal inductor, or even facilitating assembly thereof.

In particular, it seeks to provide an electromagnetic pump with improved passive cooling, notably at temperatures above 200° C.

SUMMARY OF THE INVENTION

A device able to overcome these disadvantages is an electromagnetic induction pump of substantially tubular shape extending in a longitudinal direction and comprising:
- a substantially tubular internal inductor comprising a plurality of internal combs and a plurality of internal coils arranged at least between the teeth of said internal combs, the inside of said internal inductor forming a cavity;
- an internal tube positioned around the internal inductor;
- a pumping canal allowing the circulation of a fluid that is to be pumped;
- an external tube, the pumping canal being formed between the internal tube and the external tube;
- a substantially tubular external inductor positioned around the external tube and comprising a plurality of external combs and a plurality of external coils positioned at least between the teeth of said external combs;
- the electromagnetic pump being characterized in that it further comprises a movement device for moving the internal combs, said movement device being able to cause the radial clearance between said internal combs and the internal tube to vary between a first clearance in which no tooth of the internal combs is in contact with said internal tube, and a second clearance in which all or some of the teeth of said internal combs are in contact with said internal tube, said movement device comprising a first part positioned inside the internal inductor and in connection with the internal combs so as to be able to move them radially, and a second part extending at least partially on the outside of the internal inductor and being connected to the first part in such a way as to control said first part.

The fluid that is to be pumped is a conducting fluid, and preferably a liquid metal.

What is meant by "between a first clearance in which no tooth of the internal combs is in contact with said internal tube, and a second clearance in which all or some of the teeth of said internal combs are in contact with said internal tube" is, according to the invention, that the radial clearance can adopt any value comprised between the first clearance and the second clearance, including said first clearance and said second clearance.

The principle of the invention is to make use of the thermal pathway formed by all of the combs of the internal magnetic circuit of the electromagnetic pump. More specifically, the invention consists in allowing intimate contact between the combs of the internal inductor (referred to as "internal combs") and the internal tube of the electromagnetic pump in order to limit as far as possible the thermal resistance of contact between these components, and do so in a way that is easy to implement and to regulate.

The notable improvement afforded by the invention lies in the possibility of regulating the contact force (that can also be referred to as "pressing force") of each internal comb against the internal tube and to do so without the need to dismantle the pump. Regulation can thus be achieved by access to the outside of the pump while the latter, stationary, is still in place in its circuit being operated.

Such regulation is a major advantage for assembling the internal inductor inside the electromagnetic pump. The possibility of regulating the force of contact of each internal comb with the internal tube makes it possible either to create sufficient contact force to ensure heat transfer, or to reduce or eliminate such contact force, or else to create an insertion clearance by placing the internal combs in a radially set back position to facilitate the insertion of the internal inductor into the electromagnetic pump.

This is also an important advantage with regard to the reliability of the electromagnetic pump and its level of availability. Specifically, by easily creating a clearance between the internal inductor and the internal tube, the internal inductor becomes quicker and easier to replace in the event of it being defective. This increases availability. With regard to reliability, the possibility of modifying the pressing force makes it possible to ensure that the best possible exchange of heat can be maintained throughout the entire life of the inductor, thereby limiting its temperature and increasing its reliability.

The invention also makes it possible to verify that contact has been achieved correctly and/or that it has not relaxed over the course of time.

A radial movement device of the same type may also be applied to the external inductor.

The dissipation of the heat produced is thus encouraged by such a suitable mechanical design of the electromagnetic pump, and this design also significantly facilitates assembly of the internal inductor inside the electromagnetic pump.

The movement device may be broken down into a number of embodiments including the embodiments described hereinafter, which may be combined with one another unless indicated to the contrary.

According to one embodiment, the second part of the movement device extends substantially in the longitudinal direction and is able to move in said longitudinal direction.

According to one embodiment, the second part of the movement device comprises a plurality of bars of which a first end extends on the outside of the electromagnetic pump and a second end extends into the cavity formed inside the internal inductor, each bar being mechanically connected, between its first end and its second end, to the first part of the movement device inside said internal inductor. A bar refers to an elongate component, generally of uniform and cylindrical cross section. It may be a rod, a through bolt, etc. The bar is preferably made of metal.

According to one particular embodiment, the first end of each bar features a screw thread and the movement device further comprises a plurality of nuts, a nut being able to collaborate with the screw thread of the first end of a bar so that the turning of the nut governs the movement of said bar in the longitudinal direction.

According to one embodiment, the first part of the movement device comprises a plurality of spring leaves, a spring leaf being in contact on the one hand with an internal comb and on the other hand with a bar. The spring leaf is also preferably secured to said internal comb. As an alternative to a spring leaf, this may be some other component that can be brought into contact with, and preferably secured to, a comb and which is suitable for moving said comb radially when the bar is moved. Said component may thus be a deformable component other than a spring leaf, or a component able to be deformed little, if at all, for example a mechanical component of the cam type.

According to one particular embodiment, each bar features on its exterior lateral surface, facing a comb, at least one recess able to collaborate with a spring leaf so that when the bar is moved in the longitudinal direction, said spring leaf is moved radially between inside the recess and outside said recess, or conversely between outside the recess and inside said recess, thus causing a radial movement of the internal comb in contact with said spring leaf. The spring leaf is deformable so as to be able to absorb manufacturing and mechanical assembly imperfections and also changes in clearances during operation, notably under the effect of the dimensional variations brought about by temperature levels.

According to one particular embodiment, a bar is able to control the radial movement of a single internal comb. According to an alternative embodiment, a bar is able to control the radial movement of several internal combs.

According to one embodiment, a bar features on its exterior lateral surface a plurality of recesses able to collaborate with a plurality of spring leaves in contact with an internal comb.

According to one embodiment, the movement device further comprises a support tube above which the bars are positioned.

According to one particular embodiment, the bars are uniformly positioned around the support tube.

According to one particular embodiment, the support tube comprises at least a reinforcing ring positioned against the interior wall of said support tube at the site of the recesses of the bars.

According to one particular embodiment, the support tube features on its exterior wall an additional thickness at the site of the recesses of the bars.

According to one particular embodiment, the support tube comprises on its exterior wall guide rings for guiding the bars, said guide rings comprising orifices allowing said bars to move in the longitudinal direction.

According to one embodiment, the movement device further comprises a radial-guidance means for guiding the internal combs.

Furthermore, according to one particular embodiment, the electromagnetic pump comprises an additional movement device which is a device for moving the combs of the external inductor (the external combs), said additional movement device being able to vary the radial clearance between said external combs and the external tube. All the embodiments and variants described in respect of the movement device for moving the internal combs also apply to the movement device for moving the external combs.

BRIEF DESCRIPTION OF THE DRAWINGS

Further features and advantages of the invention will become apparent from the following description, given by way of nonlimiting illustration with reference to the attached figures, among which:

FIG. 1 depicts an annular electromagnetic induction pump of the prior art.

DETAILED DESCRIPTION

FIG. 1 which depicts an annular electromagnetic induction pump of the prior art has already been described hereinabove and will not be reconsidered here.

Figure 2A:
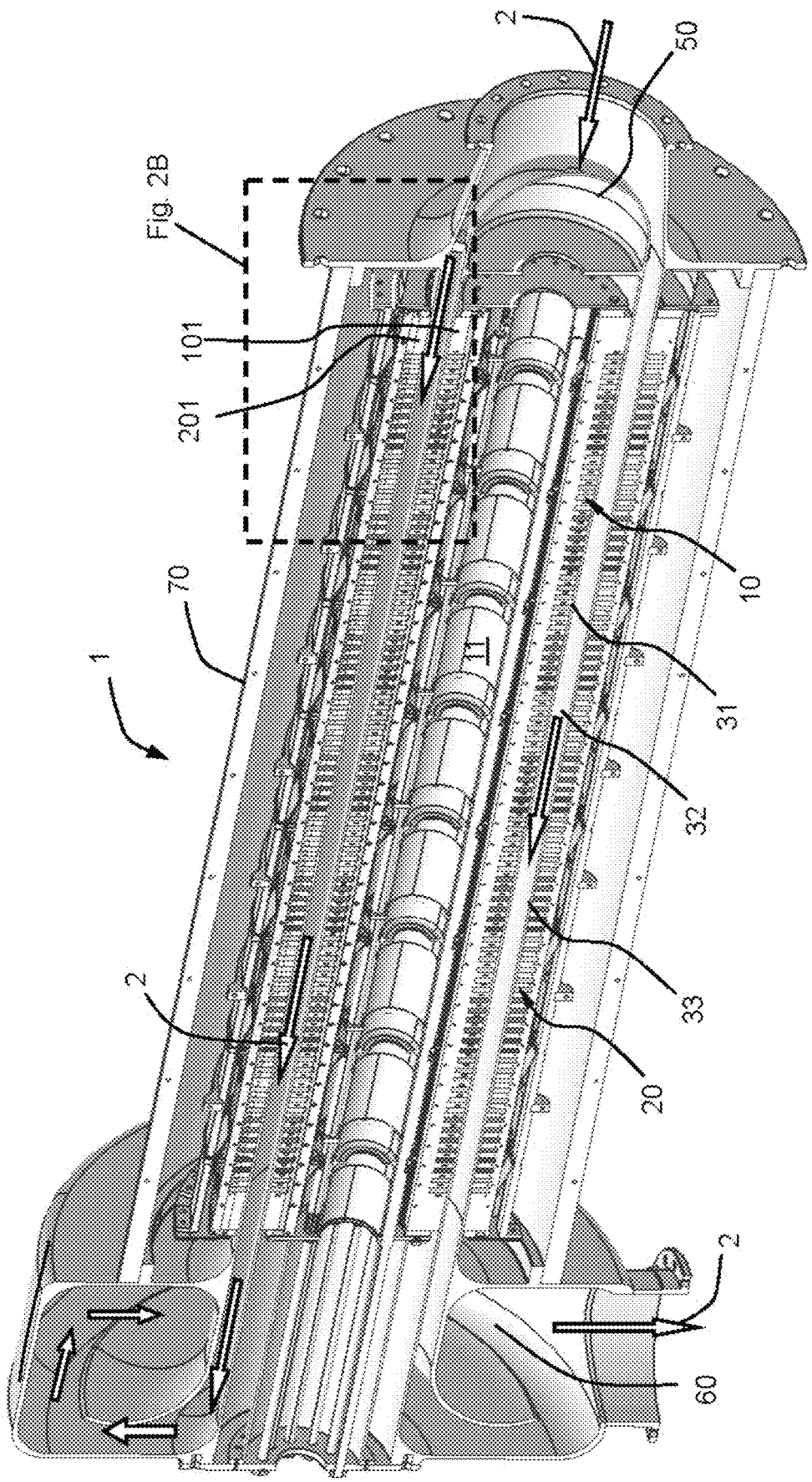
FIG. 2A.
Figure 2B:
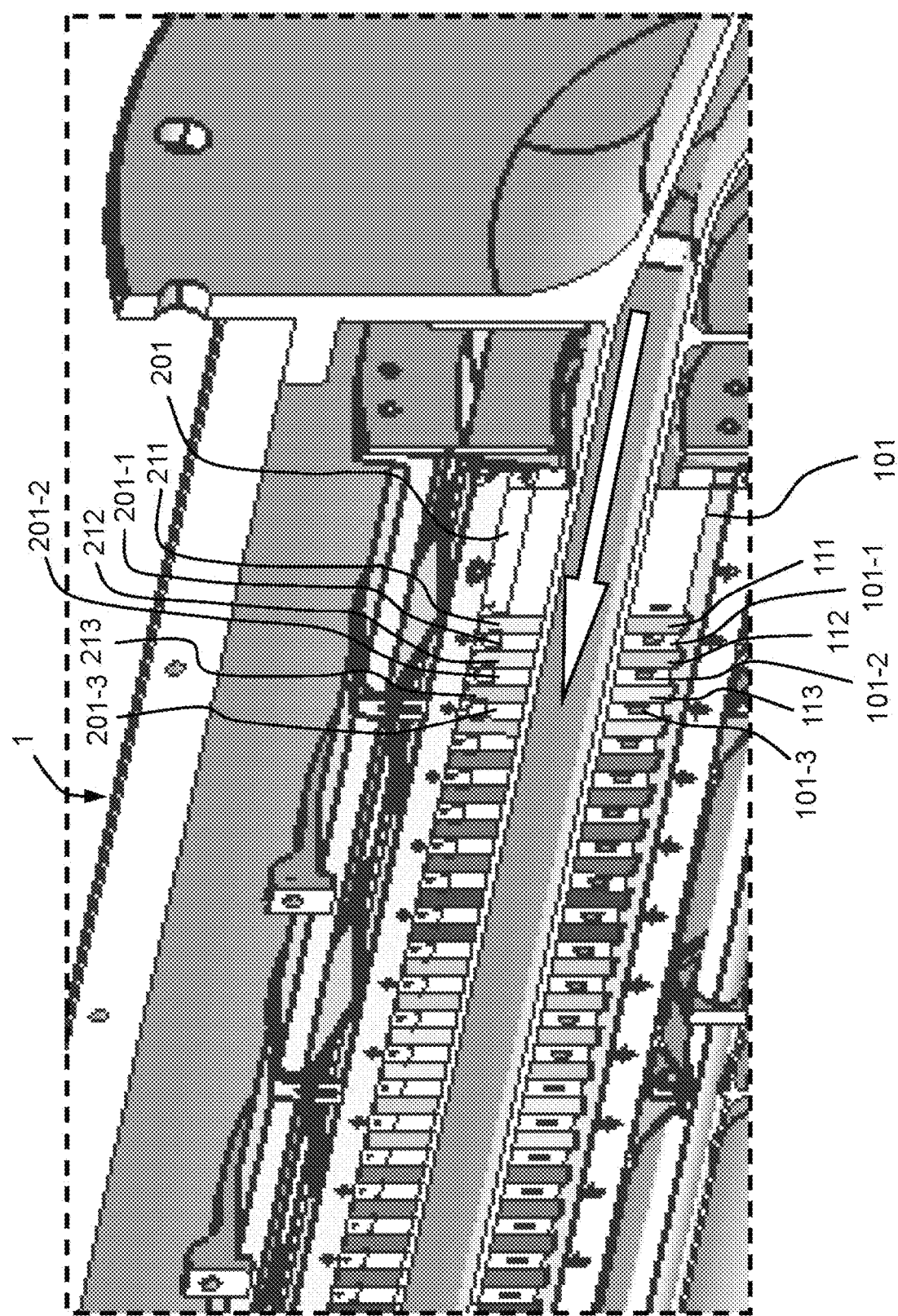
FIG. 2B depict one embodiment of an electromagnetic pump according to the invention.
Figure 3A:
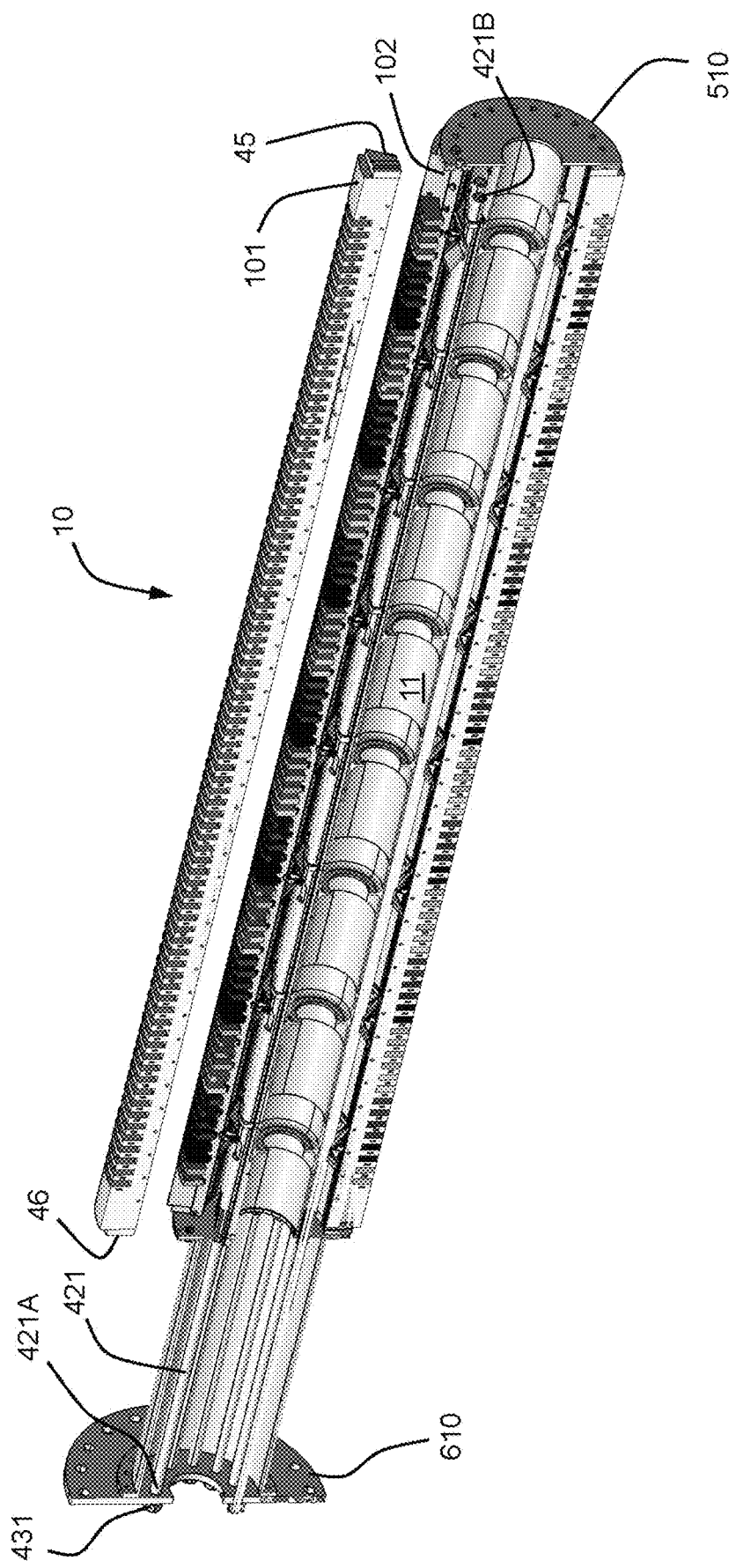
FIG. 3A.
Figure 3B:
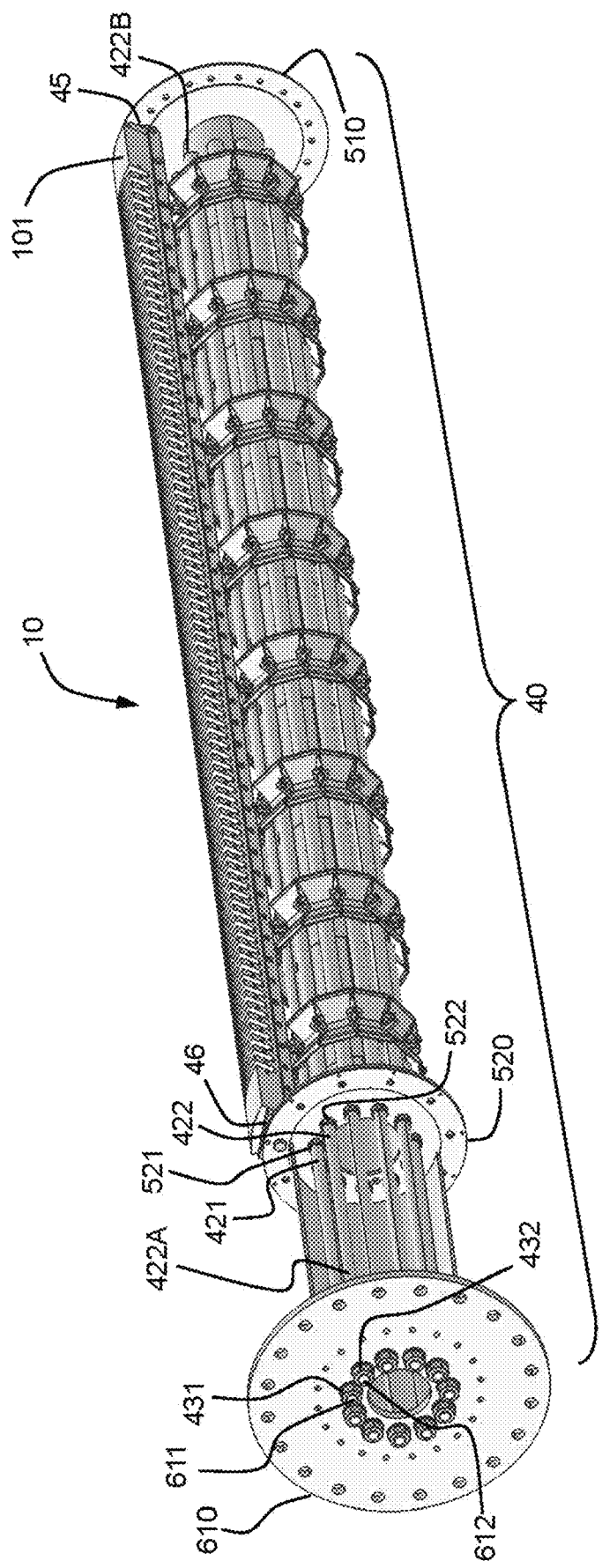
FIG. 3B depict an exploded view of the internal inductor of the electromagnetic pump according to the embodiment of the invention.
Figure 4:
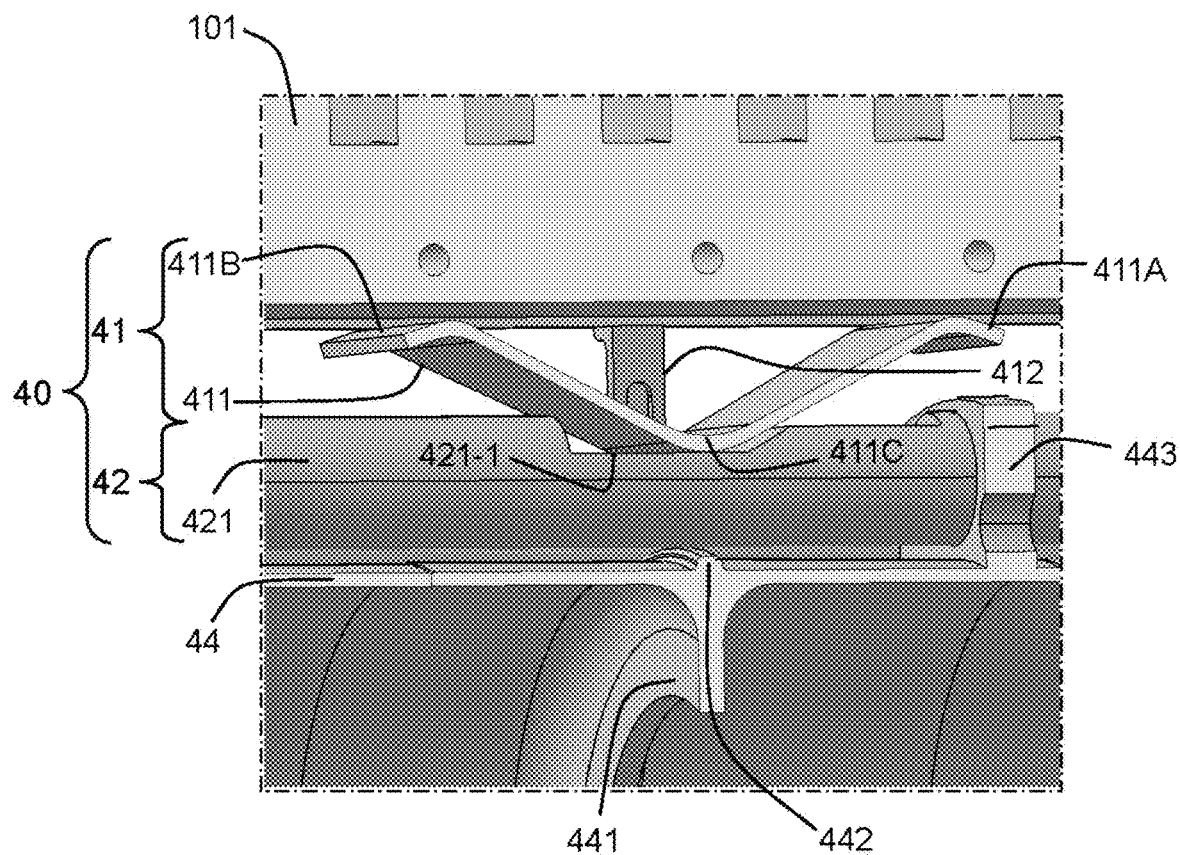
FIG. 4 depicts in detail the movement device of the electromagnetic pump according to the embodiment of the invention.
Figure 5A:
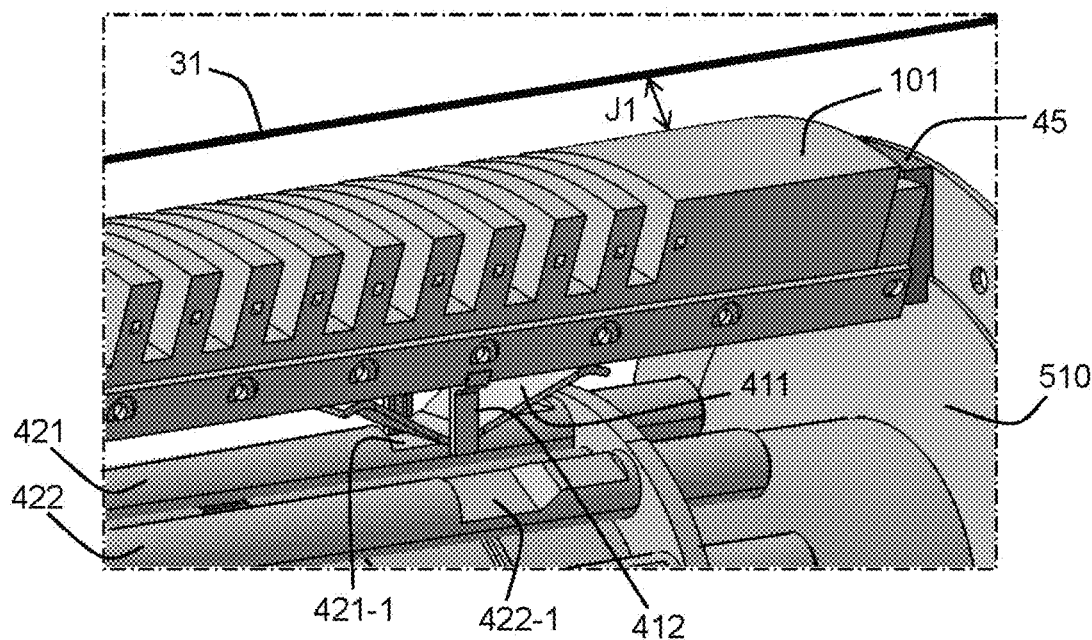
FIG. 5A.
Figure 5B:
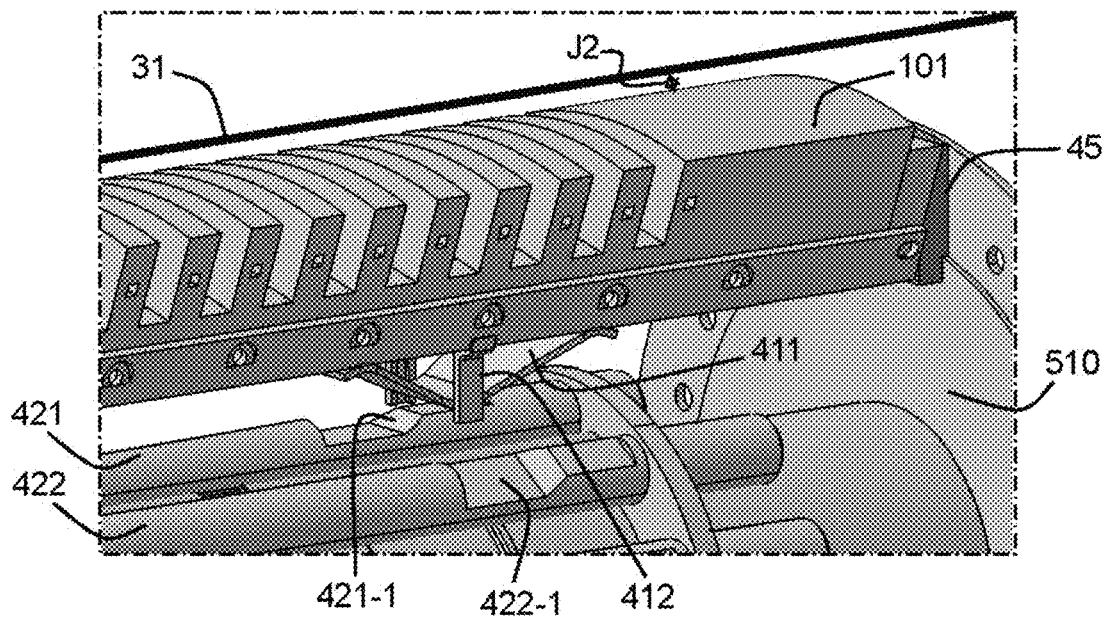
FIG. 5B depicts the movement device in two different positions.

FIGS. 2A, 2B, 3A and 3B depict one embodiment of an electromagnetic pump according to the invention, and FIGS. 3A and 3B in particular depict an internal inductor of the pump. FIG. 4 depicts in detail the movement device of the electromagnetic pump according to the embodiment. FIGS. 5A and 5B depict the movement device in two different radial positions.

The electromagnetic pump is an annular electromagnetic induction pump which comprises, in the same way as the electromagnetic pump of the prior art as illustrated in FIG. 1, starting from a central axis X (which is also the longitudinal direction) of the electromagnetic pump 1:

an internal inductor (or internal stator) 10;
an internal tube 31 containing the internal inductor;
a pumping canal 32 in which a fluid 2 that is to be pumped can circulate, the internal wall of the pumping canal being formed by the internal tube 31;
an external tube 33, forming the external wall of the pumping canal;
an external magnetic inductor (or external stator) 20 positioned around the external tube 33.

Thus, the pumping canal 32 is formed between the internal tube 31 and the external tube 33.

Moreover, the electromagnetic pump 1 comprises an exterior cylindrical shell 70 assembled with an inlet shell ring 50 (which may be referred to as the "convergent inlet") configured to convey the fluid 2 into the pumping canal and with an outlet shell ring 60 (which may be referred to as "collector") able to recover the fluid 2 leaving the pumping canal.

The internal inductor, the internal tube, the pumping canal, the external tube, the external inductor and the outer shell are arranged substantially concentrically about the central axis X.

The internal inductor 10 is substantially tubular and comprises several combs 101, 102, referred to as "internal combs", and a plurality of internal coils 111, 112, 113, each internal coil being wound at least between the teeth 101-1, 101-2, 101-3 of each internal comb 101. The inside 11 of said internal inductor is hollow.

The external inductor 20 is also substantially tubular and comprises several combs 201, 202, referred to as "external combs", as well as a plurality of external coils 211, 212, 213, each external coil being wound at least between the teeth 201-1, 201-2, 201-3 of each external comb.

The space between the teeth of the internal (or external) combs may be formed by slots, these slots being designed to allow the internal (or external) respective coils to pass.

Each coil has an annular shape wound about the central axis, passing between the teeth of the combs.

According to the invention, the electromagnetic pump comprises a radial movement device 40 which acts on the internal combs 101, 102 to make it possible to regulate the radial clearance between the internal inductor 10 and the internal tube 31.

The movement device depicted consists of a camlike mechanism and comprises a plurality of bars 421, 422 of which a first end 421A, 422A extends outside the electromagnetic pump, so that the control and/or regulation can be offset and effected from outside the electromagnetic pump. What is meant by "outside the electromagnetic pump" means at least outside of the active elements (inductors, etc.) of the electromagnetic pump, for example on the pump head of the electromagnetic pump. Regulation can thus be effected via access to the outside of the pump while the pump, stopped, is however still in place in its circuit being operated.

According to the example depicted, the first end 421A of each bar 421 is threaded. More specifically, at its first end, each bar 421, 422 extends through an orifice 611, 612 formed in an end plate 610 of the collector 60, and a nut 431, 432 is secured to the screw thread of the bar 421, 422 exiting this orifice. Thus, tightening or loosening the nut on the screw thread makes it possible to regulate the movement of the bar in the longitudinal direction X of the electromagnetic pump. This tightening/loosening operation can be performed manually or in an automated manner.

The screw-thread/nut system is given by way of illustration and is nonlimiting. As an alternative to the screw/nut conversion system illustrated, any other system allowing controlled movement of each bar may be envisioned, for example an actuator, a slideway system, a cable, a rack/pinion system, etc. Furthermore, such a system may be positioned elsewhere than on the collector end plate, or even at another point on the pump.

The second end 421B, 422B of each bar is positioned inside the electromagnetic pump and more specifically in the cavity 11 of the internal inductor 10. Provided between the first end and the second end of each bar is a mechanism for driving the first part 41 of the radial movement device and, in particular, for driving at least one spring leaf 411 in the radial direction.

Each bar 421 further features on its lateral surface facing the internal comb at least one radial recess 421-1, a recess being associated with a spring leaf 411. The middle part 411C of the spring leaf is in contact with the lateral surface of the bar and the ends 411A, 411B of the leaf are also in contact with the internal comb 101. A leaf is furthermore secured to the first comb by at least one finger 412 so that the leaf cannot be driven in a translational movement in the direction X by the bar and so that it acts on the internal comb mainly in radial movement.

The leaves are thus advantageously spring leaves. The deformation of the leaves effectively ensures that contact is established and that a contact force is applied compressing the internal combs and internal tube against each other. This contact force is relatively constant thanks to the action of the leaves, for the entire range of operation of the electromagnetic pump. Furthermore, the deformation of the leaves makes it possible to absorb manufacturing and mechanical assembly imperfections and also changes to the clearances in operation, notably under the effect of the dimensional variations induced by the temperature levels.

Alternatively, the leaves may be nondeformable or capable of very little deformation, or may be replaced by other mechanical components such as cams for example.

According to the embodiment depicted, each bar 421 is associated with an internal comb 101, and a recess in a bar 421-1 is associated with a spring leaf 411. There are therefore as many bars as there are internal combs.

A bar, associated with an internal comb, may advantageously feature several radial recesses positioned in the longitudinal direction X, each recess being associated with a spring leaf. In that case, there are as many spring leaves connected to said internal comb as there are recesses. That means that the pressure force applied to said internal comb can be spread.

When a bar 421 is moved in the longitudinal direction X, the spring leaf 411 follows the surface of the bar. Thus, when the leaf is in contact in the radial recess 421-1, it drives or maintains the internal comb 101 toward the inside of the electromagnetic pump and thus increases the clearance J1 to the internal tube (FIG. 5A). Conversely, when the leaf is in contact with the planar surface, it pushes the internal comb toward the internal tube (FIG. 5B). The clearance J2 becomes nil or practically nil. The elasticity of the leaf means that contact with the bar is maintained even when it comes into contact in a radial recess. If the recess is chamfered, as illustrated in FIG. 4, there may be an intermediate position, allowing better regulation of the positioning of the internal combs with respect to the internal tube. More generally, the profile of the recess may be adapted to suit the mode of actuation of the associated spring leaf and the contact control requirements sought.

The movement device depicted further comprises a support tube 44 above which the bars are positioned. In the device depicted, the bars are uniformly positioned all around the support tube. The inside of the support tube may be reinforced at the site of at least one recess of the bar, for example using a reinforcing ring 441 formed against the interior wall of the support tube at the site of said recess. Any other reinforcing means may be envisioned.

The outside of the support tube may feature at least one additional thickness 442 at the site of at least one recess of the bar. This additional thickness forms a localized support which compensates for the flexing of the bar that occurs when it exerts action on the leaf. Any other means able to perform this supporting function may be envisioned, which incidentally may be formed elsewhere than on the support tube.

Furthermore, positioned on the exterior surface of the support tube are bar guide rings 443. Orifices are formed in said rings to accept and maintain the bars while at the same time allowing them to slide in the longitudinal direction X. Any other means able to perform this function of maintaining and allowing the sliding of the bars may be envisioned.

The movement device depicted further comprises a radial-guidance means 45 for guiding the internal combs, and which for example comprises a slideway or a rail connected on the one hand to an internal comb and on the other hand to an end plate 510 of the inlet shell ring.

A second radial-guidance means 46 which comprises for example a slideway or a rail connected on the one hand to an internal comb and on the other hand to a second plate 520 may be provided at the other end of the internal combs, as depicted in FIG. 3B. In that case, for preference, the second plate has orifices 521, 522 for the passage of the bars 421, 422.

As depicted, a bar may thus be dedicated to the radial movement of an internal comb, in combination with at least one spring leaf. Thus, the radial movement of an internal comb may be regulated individually by means of the bar dedicated to it.

Furthermore, such a movement device also makes it possible to check the contact force of the internal combs, advantageously individually, without the need to dismantle the electromagnetic pump, and notably without the need to break into the fluid circuit. The contact force can be measured by checking the length of the bar protruding out of the electromagnetic pump (beyond the regulating nuts 431, 432). Alternatively, the tensile force on a bar can be measured. To do that, a load cell (for measuring compression) may be interposed between a nut 431, 432 and the plate 610.

The ability to measure the contact force is particularly advantageous when the fluid is sodium, especially if this measurement does not require the dismantling of the electromagnetic pump, as is permitted with an electromagnetic pump according to the invention and in particular with the contact force measurement means described above.

The movement device also makes it possible to form a radial clearance between the internal combs (the combs of the internal inductor) and the internal tube, thereby allowing the internal inductor to be introduced into said internal tube. Thereafter, the device is able to close up the clearance again so as to press the internal combs against the internal tube. That makes it possible to limit resistive forces when inserting the internal inductor into the internal tube outside of operation, and then in operation ensure the transmission of heat.

Figure 6:
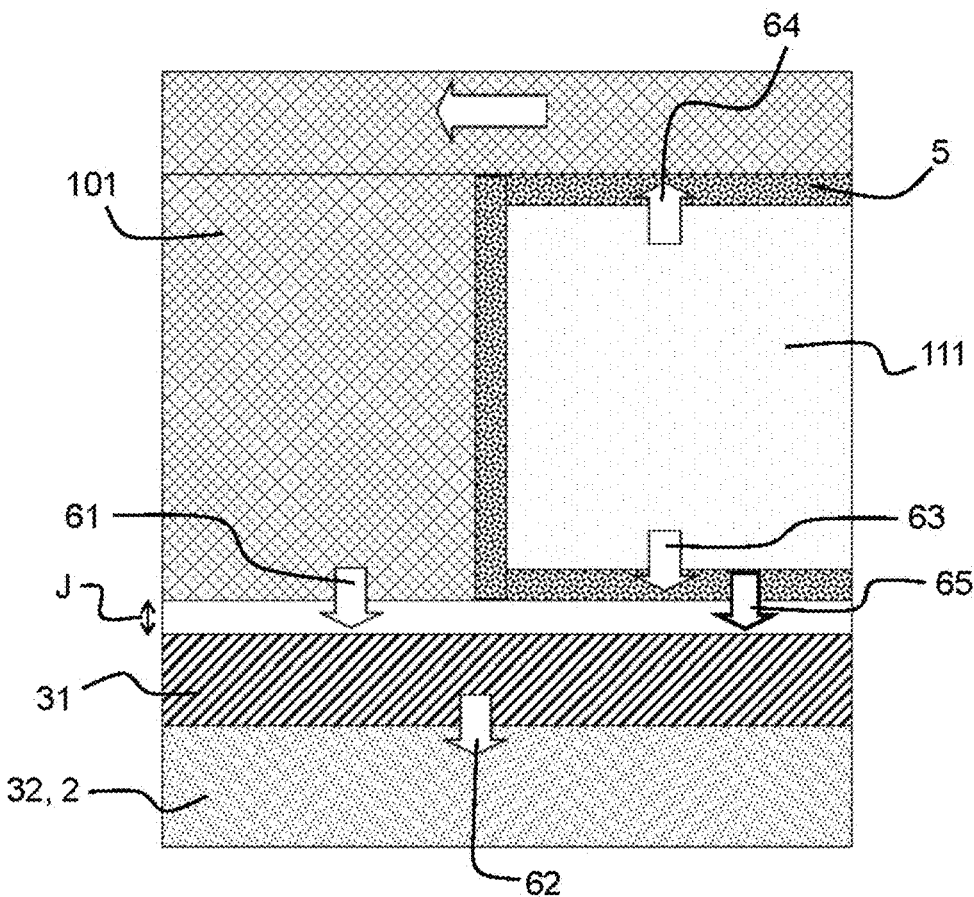
FIG. 6 schematically indicates the transfers of heat between the internal inductor and the internal tube.

The heat transmission function that the invention permits is illustrated in FIG. 6. Thus, an internal comb 101, an internal coil 111 positioned in a slot between two internal combs, an internal tube 31 and the pumping canal 32 in which the pumped fluid 2 circulates are depicted. The internal coil 111 has passing through it an electric current which is a source of volumetric thermal power. This thermal power is transmitted by the coil to the pumped fluid 2 which acts as a cooling fluid. The transmission of this heat passes along two pathways. The first pathway is indicated by the arrows 64, 61 and 62. The thermal power flows from the coil 111 via the insulator 5 to the comb 101 (arrow 64) then from the comb 101 via the clearance J to the tube 31 (arrow 61) then from the tube 31 to the fluid 2 (arrow 62). The second pathway is indicated by the arrows 63, 61 and 62. On that pathway, the thermal power flows from the coil 111 via the insulator 5 (arrow 63) and the clearance J (arrow 61 or 65) to the internal tube 31 then from the internal tube 31 to the fluid 2 by direct contact (arrow 62). The clearance J is therefore directly and significantly involved in the two pathways for the removal of the heat produced within the coil 111 to the fluid 2.

The invention makes it possible to reduce the clearance J between, on the one hand, the internal comb 101 and the insulator 5 of the coil 111 and, on the other hand, the internal tube 31, by pressing the internal comb against the internal tube, or at least by getting it as close as possible thereto. This makes it possible to significantly improve the heat transfer between the internal comb and the internal tube (arrow 61) and between the coil and the internal tube (arrow 63) and thereby improve the heat removed to the fluid 2 through the internal tube (arrow 62).

Furthermore, the electromagnetic pump may comprise a movement device for moving the external combs (the combs of the external inductor), which may be equivalent to the movement device for moving the internal combs as set out in the embodiment, or which may be different, within the scope of the claims. That then makes it possible to improve the transfer of heat between the external combs and the external tube, in the same way as for the internal combs and the internal tube. All the variants described in respect of the device for moving the internal combs applies to a device for moving the external combs.

The present invention is not restricted to the embodiments described hereinabove but extends to any embodiment that falls within the scope of the claims.

The invention may notably find applications in sodium-cooled fast neutron reactors, particularly in the secondary cooling circuits of Na-FNRs.

The invention claimed is:

1. An electromagnetic induction pump of substantially tubular shape extending in a longitudinal direction (X) and comprising:

a substantially tubular internal inductor comprising a plurality of internal combs and a plurality of internal coils arranged at least between teeth of said internal combs, an inside of said internal inductor forming a cavity;

an internal tube positioned around the internal inductor;

a pumping canal allowing the circulation of a fluid that is to be pumped;

an external tube, the pumping canal being formed between the internal tube and the external tube;

a substantially tubular external inductor positioned around the external tube and comprising a plurality of external combs and a plurality of external coils positioned at least between the teeth of said external combs;

the electromagnetic pump further comprising a movement device for moving the internal combs, said movement device being able to cause a radial clearance between said internal combs and the internal tube to vary between a first clearance (J1) wherein no tooth of the internal combs is in contact with said internal tube, and a second clearance (J2) in which all or some of the teeth of said internal combs are in contact with said internal tube, said movement device comprising a first part positioned inside the internal inductor and in connection with the internal combs so as to be able to move them radially, and a second part extending at least partially on the outside of the internal inductor and being connected to the first part in such a way as to control said first part.

2. The electromagnetic pump according to claim 1, the second part extending substantially in the longitudinal direction (X) and being able to be moved in said longitudinal direction.

3. The electromagnetic pump according to claim 2, the second part comprising a plurality of bars of which a first end extends on the outside of the electromagnetic pump and a second end extends into the cavity formed inside the internal inductor, each bar being mechanically connected, between its first end and its second end, to the first part of the movement device inside said internal inductor.

4. The electromagnetic pump according to claim 3, the first end of each bar featuring a screw thread and the movement device further comprising a plurality of nuts, each nut of the plurality of nuts being able to collaborate with the screw thread of the first end of a respective bar of the plurality of bars, so that a turning of said each nut governs movement of said respective bar in the longitudinal direction (X).

5. The electromagnetic pump according to claim 3, the first part comprising a plurality of spring leaves, each spring leaf of the plurality of spring leaves being in contact with a respective internal comb of the plurality of internal combs, and in contact with a respective bar of the plurality of bars.

6. The electromagnetic pump according to claim 3, each spring leaf of the plurality of spring leaves being secured to a respective internal comb of the plurality of internal combs.

7. The electromagnetic pump according to claim 5, each bar of the plurality of bars featuring on its exterior lateral surface at least one recess able to collaborate with a respective spring leaf of the plurality of spring leaves so that when said each bar is moved in the longitudinal direction (X), said spring leaf is moved radially between inside the recess and outside said recess, or conversely between outside the recess and inside said recess, thus causing a radial movement of the respective internal comb in contact with said spring leaf.

8. The electromagnetic pump according to claim 3, a bar of the plurality of bars being able to control radial movement of a single internal comb of the plurality of internal combs.

9. The electromagnetic pump according to claim 3, a bar of the plurality of bars being able to control radial movement of several internal combs of the plurality of internal combs.

10. The electromagnetic pump according to claim 3, a bar of the plurality of bars featuring on its exterior lateral surface a plurality of recesses able to collaborate with a plurality of spring leaves of the plurality of spring leaves in contact with an internal comb of the plurality of internal combs.

11. The electromagnetic pump according to claim 1, the movement device further comprising a support tube above which a plurality of bars are positioned.

12. The electromagnetic pump according to claim 11, the plurality of bars being uniformly positioned around the support tube.

13. The electromagnetic pump according to claim 11, the support tube comprising at least a reinforcing ring positioned against an interior wall of said support tube at a site of recesses on the plurality of bars.

14. The electromagnetic pump according to claim 11, the support tube featuring on its exterior wall an additional thickness at a site of recesses on the plurality of bars.

15. The electromagnetic pump according to claim 11, the support tube comprising on its exterior wall guide rings for guiding the plurality of bars, said guide rings comprising orifices allowing said plurality of bars to move in the longitudinal direction (X).

16. The electromagnetic pump according to claim 1, the movement device further comprising a means for radially guiding the plurality of internal combs.

* * * * *